US008589349B2

(12) United States Patent
Grant et al.

(10) Patent No.: US 8,589,349 B2
(45) Date of Patent: Nov. 19, 2013

(54) TRACKING AND VIEWING REVISION HISTORY ON A SECTION-BY-SECTION BASIS

(75) Inventors: Cristina L. Grant, Coral Gables, FL (US); Patricia Leon, Doral, FL (US); Adriana Valido, Pompano Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 380 days.

(21) Appl. No.: 12/827,904

(22) Filed: Jun. 30, 2010

(65) Prior Publication Data

US 2012/0005156 A1    Jan. 5, 2012

(51) Int. Cl.
G06F 7/00 (2006.01)
(52) U.S. Cl.
USPC ........... 707/638; 707/821; 715/762; 717/136; 717/123
(58) Field of Classification Search
USPC ........... 707/638, 821; 715/762; 717/123, 136
See application file for complete search history.

(56) References Cited

U.S. PATENT DOCUMENTS

| | | | |
|---|---|---|---|
| 5,600,778 A * | 2/1997 | Swanson et al. ............... 715/762 |
| 6,931,590 B2 | 8/2005 | Kanie et al. |
| 7,509,307 B2 | 3/2009 | Biswal et al. |
| 7,568,154 B2 | 7/2009 | Salesin et al. |
| 2002/0194059 A1* | 12/2002 | Blocher et al. .................. 705/11 |
| 2003/0051227 A1* | 3/2003 | Burch et al. ................... 717/109 |
| 2003/0079181 A1* | 4/2003 | Schumacher et al. ......... 715/513 |
| 2004/0044550 A1* | 3/2004 | Self et al. ............................ 705/7 |
| 2004/0250215 A1* | 12/2004 | Chen et al. ..................... 715/769 |
| 2005/0138540 A1 | 6/2005 | Baltus et al. |
| 2007/0033654 A1 | 2/2007 | Wilson |
| 2007/0043742 A1* | 2/2007 | Arguello et al. .............. 707/100 |
| 2007/0057967 A1 | 3/2007 | Armstrong |
| 2007/0101256 A1 | 5/2007 | Simonyi |
| 2007/0260996 A1* | 11/2007 | Jakobson ....................... 715/781 |
| 2008/0086692 A1 | 4/2008 | Berstis et al. |
| 2008/0177782 A1 | 7/2008 | Poston et al. |
| 2008/0312919 A1 | 12/2008 | Grobauer et al. |
| 2009/0287659 A1 | 11/2009 | Bennett |
| 2011/0087955 A1* | 4/2011 | Ho et al. ........................ 715/230 |
| 2011/0119195 A1* | 5/2011 | McLees et al. ................ 705/301 |

OTHER PUBLICATIONS

Parnin et al., MSR'06, May 22-23, 2006, Shanghai, China, pp. 155-158.*
M. Noronha et al., "Extending a Structured Document Model With Version Control", IEEE Xplore, pp. 1-9.
M. Schonhoff et al. "Version Propagation in Federated Database Systems", IEEE Xplore, pp. 189-198.

* cited by examiner

Primary Examiner — Cheyne Ly
(74) Attorney, Agent, or Firm — Law Office of Jim Boice

(57) ABSTRACT

In one embodiment, a file includes data that is divided into a plurality of sections, and each section may include metadata that includes the revision history for that section. A specific section of the file may be selected and its revision history queried. In response to such a query, the revision history for the selected section is extracted from the section metadata and may be displayed. If a portion of a section has been copied from a source section and pasted into a target section, the section metadata for the target section may be updated to include information about the source section. For each change to the section data, the section metadata may also include a version number, a revision date and time, a revision author and the actual insertion, deletion or other change to the section data.

20 Claims, 6 Drawing Sheets

TRACKING AND VIEWING REVISION HISTORY ON A SECTION-BY-SECTION BASIS

BACKGROUND

The present invention relates to a computer or other data processing system and software and, more specifically, to tracking and displaying the revision history of sections of documents or files.

Computer files containing data, program code and other information are often edited multiple times, resulting in multiple versions of the file being stored. Examples of such files include wiki pages containing text and other data, and files containing computer programming code that are produced by an Integrated Development Environment ("IDE"). These edits are often made by multiple people and from more than one computer, such that no one person has personal knowledge of all the edits that have been made. Using versioning software or a source control system, a user working on a current version of a file can recall previous versions of the file, as well as compare two selected previous versions of the file to reveal the changes that occurred in the file from one version to another. Thus, these multiple versions are useful to reveal how a file evolved into its current version by showing the history of the file edits.

SUMMARY

In one embodiment of the invention, a method includes loading a file into a memory of a data processing system. The file includes data divided into a plurality of sections, each of the sections includes section metadata, and each of the section metadata includes section revision history. A first section revision history is queried in response to a selection of a first section from the plurality of sections. The first section includes first section metadata, which includes the first section revision history. The first section revision history includes information associated with a first change, a second change and a third change to the first section. The first section revision history is extracted from the first section revision history from the first section metadata.

In another embodiment of the invention, a computer program product includes a computer readable storage medium having computer readable program code embodied therewith. The computer readable program code includes program code configured to open a file comprising data divided into a plurality of sections, where each of the sections includes section metadata, and each of the section metadata includes section revision history. The program code is configured to select a first section from the plurality of sections, where the first section includes first section metadata, the first section metadata includes a first section revision history, and the first section revision history includes information associated with a first change, a second change and a third change to the first section. The program code is configured to query the first section revision history, and to extract the first section revision history from the first section metadata.

In another embodiment of the invention, an apparatus includes a storage device having computer executable code, and a processor coupled to the storage device. The processor executes the computer executable program code to direct the apparatus to open a file that includes data divided into a plurality of sections, where each of the sections includes section metadata having section revision history. A first section is selected from the plurality of sections, where the first section includes first section metadata. The first section metadata includes first section revision history, which includes information associated with a first, a second and a third change to the first section. The first section revision history is queried and extracted from the first section metadata.

DETAILED DESCRIPTION

Figure 1:
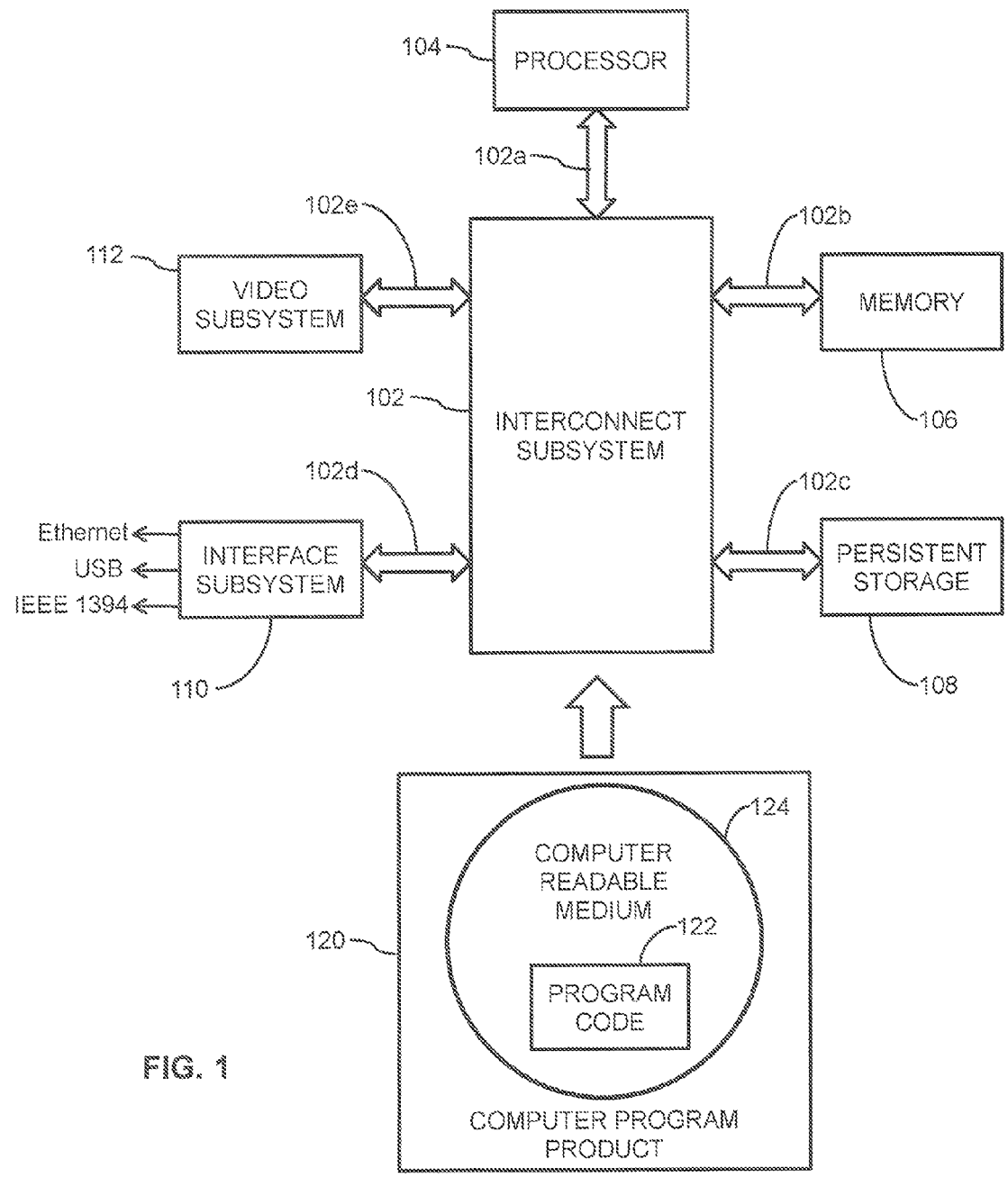
FIG. 1 is a block diagram of an exemplary computer or other data processing system in which various embodiments of the present invention may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein; for example, in baseband or as part of a carrier wave. Such a propagated signal may take any of a variety of forms including, but not limited to, electro-magnetic, optical or any suitable combination thereof. A computer readable signal medium may be any computer readable medium that is not a computer readable storage medium and that can communicate, propagate or transport a program for use by or in connection with an instruction execution system, apparatus or device. Program code embodied in a computer readable signal medium may be transmitted using any appropriate medium including, but not limited to, wireless, wire line, optical fiber cable, RF, etc., or any suitable combination of the foregoing.

Computer program code for carrying out operations of the present invention may be written in any combination of one or more programming languages, including an object oriented programming language such as Java™, Smalltalk, C++ or the like, and conventional procedural programming languages, such as the "C" programming language or similar programming languages. (Java and all Java-based trademarks and logos are trademarks of Sun Microsystems, Inc., in the United States, other countries or both.) The program code may execute entirely on the user's computer, partly on the user's computer, as a stand-alone software package, partly on the user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus, systems and computer program products according to various embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer or other programmable data processing apparatus to function in a particular manner, such that the instructions stored in the computer readable medium produce an article of manufacture including instructions which implement the function/act specified in the flowchart and/or block diagram block or blocks. The computer program instructions may also be loaded onto a computer or other programmable data processing apparatus to cause a series of operational steps to be performed in the computer or other programmable apparatus to produce a computer-implemented process, such that the instructions that execute in the computer or other programmable apparatus provide processes for implementing the functions/acts specified in the flowchart and/or block diagram block or blocks.

FIG. 1 is a block diagram of an exemplary computer or other data processing system in which various embodiments of the present invention may be implemented. Referring to this figure, interconnect subsystem 102 interconnects the various components of data processing system 100, such as processor 104, memory 106, persistent storage 108, interface subsystem 110 and video subsystem 112. Interconnect subsystem 102 preferable includes one or more computer buses, and may also include one or more circuits to interconnect the various buses and components of data processing system 100. These circuits may include memory controllers, input/output controllers, and bridge circuits that bridge from one bus technology to another.

The term "bus" should be broadly interpreted to include other interconnect technologies or combinations thereof in which power, timing, data or other signals are transferred between the various components of a data processing system, or between two or more data processing systems. For example, technologies commonly classified as network and input/output, such as Ethernet and USB, and various wired, wireless, optical and infrared communication technologies may also be used to interconnect the various components of data processing system 100.

Processor 104 is connected to interconnecting subsystem 102 via bus 102a, such as a well known Front Side Bus. Processor 104 is, preferably, a well known integrated circuit, central processing unit (CPU), but it may be any data processing subsystem that processes data or executes computer program instructions, which are also known as computer executable code, computer readable program code, and similar terms. These computer program instructions and data are loaded into memory 106, which is coupled to processor 104 via memory bus 102b, interconnect subsystem 102, and bus 102a. Processor 104, in combination with a memory controller circuit in interconnect subsystem 102, fetches the data and program instructions stored in memory 106. Memory 106 may be any memory or storage device that is capable of storing and retrieving data or program instructions, but is preferably one or more semiconductor, random access memory (RAM) circuits.

Persistent storage 108 is used to store data, program instructions and other information on a more permanent or persistent basis than that of memory 106, which typically uses a fast but volatile memory technology wherein all information is lost if the power to the memory is disrupted. Persistent storage 108 is coupled to interconnect subsystem 102 via storage bus 102c, examples of which include well known IDE, SATA and SCSI buses, although other bus technologies may also be used. Data, program instructions and other information may be stored in persistent storage 108, and loaded into memory 106. Persistent storage 108 is coupled to memory 106 via bus 102c, an I/O controller circuit and a memory controller circuit in interconnect subsystem 102, and memory bus 102b.

Persistent storage 108 may be any memory or information storage device that is capable of storing data, program instructions or other information. Examples of typical persistent storage devices include magnetic storage devices (such as a hard disk drive), optical storage devices (such as a CD-ROM) and semiconductor storage devices (such as EEPROMs and flash memory). Persistent storage 108 may also include drives, connectors or other devices that accept removable storage media, such as floppy magnetic disks, optical disks and semiconductor flash memory. Persistent storage 108, as well as memory 106, may be internally located within data processing system 100, or externally located and coupled to the data processing system through Interface subsystem 110 or otherwise.

Interface subsystem 110 is coupled to interconnect subsystem 102 via bus 102d. Interface subsystem 110 may include one or more input/output (I/O) and network ports to which devices, systems and networks that are external to data processing system 100 can be connected. Examples of such devices, systems and networks include keyboards, pointing devices (such as a mouse), printers, scanners, storage devices, local area networks (LANs), wide area networks (WANs), and other data processing systems. Each of these I/O and network ports may be implemented in a different I/O or network technology, examples of which include Universal Serial Bus (USB), Ethernet, IEEE 1394 (FireWire), Small Computer System Interface (SCSI) and IEEE 802.11 (wireless LAN). In some data processing systems, portions of interface subsystem 110 may be implemented in an I/O controller circuit that is part of interconnect subsystem 102. FIG. 1 illustrates exemplary Ethernet, USB and IEEE 1394 ports of interface subsystem 110, but other ports and port technologies may be included.

Video subsystem 112, the output of which may be connected to a video display, is coupled to interconnect subsystem 102 via video bus 102e. Examples of video bus technologies include Accelerate Graphics Port (AGP) and PCI Express, although other bus technologies may be used to implement video bus 102e.

A computer program product 120 includes computer readable program code 122 embodied in a computer readable medium 124, which may be a storage medium or a signal medium. Computer readable medium 124 may include memory 106, persistent storage 108 or any storage device, including a storage device that is external to data processing system 100. An external storage device may be coupled to data processing system 100 through interface subsystem 110 or otherwise. Computer readable medium 124 may also be a removable storage medium that is capable of being inserted into an internal or external drive or other device that is adapted to read the removable storage medium. Other examples, variations and details of a computer program product, a computer readable medium and computer program code are described above.

Figure 2:
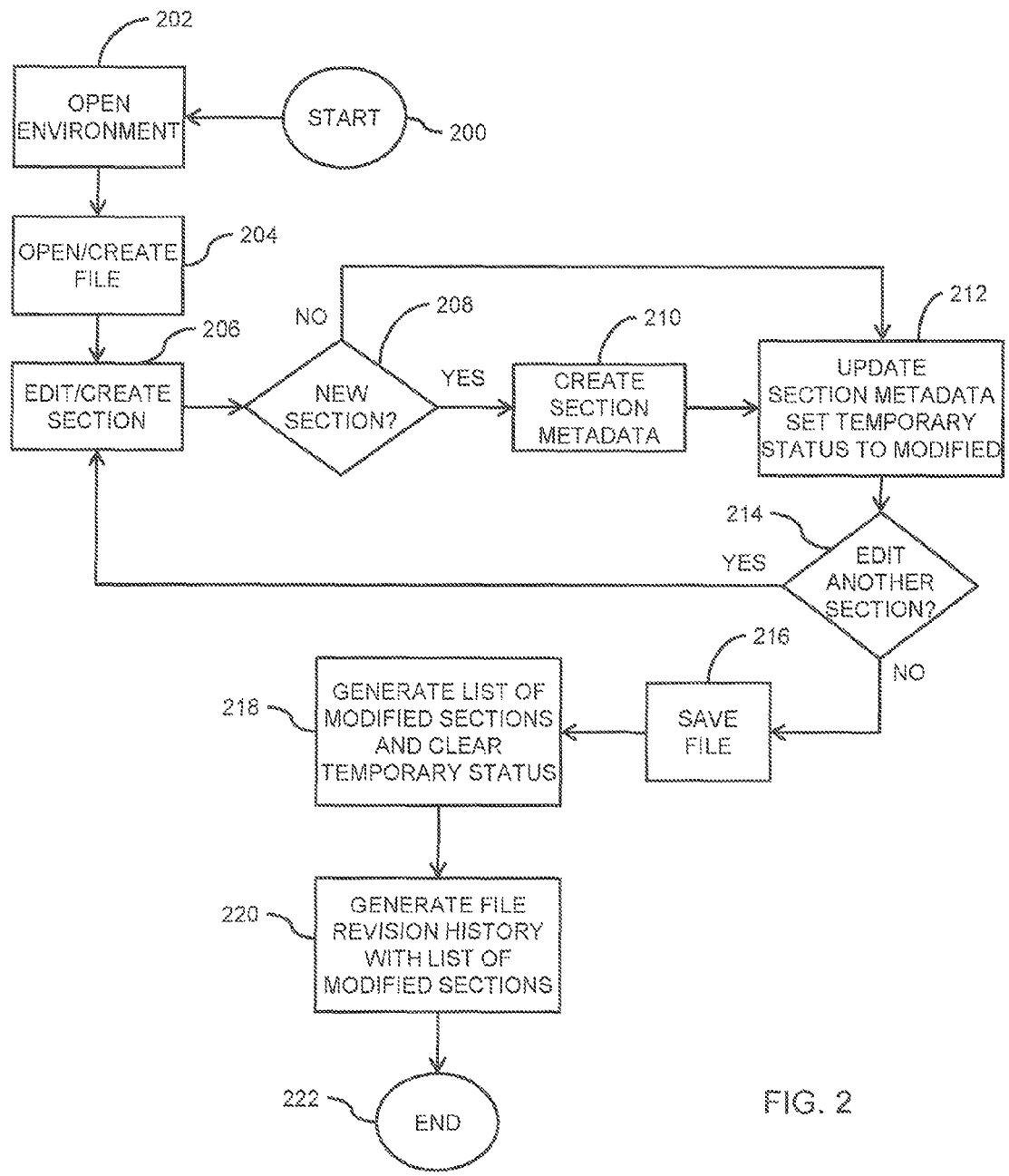
FIG. 2 is a flowchart of a process of one embodiment of the present invention in which a list of modified sections of a document or file is created.

FIG. 2 is a flowchart of a process of one embodiment of the present invention in which a list of modified sections is produced. Referring to this figure, the process starts at step 200. In step 202, a user opens an environment, such as an independent development environment (IDE) or other application in which associated documents or files can be modified. In step 204, a particular document or file within that environment is either opened (if it already exists) or created (if it doesn't currently exist). The process of opening a document or file involves, among other things, loading the document of file or a portion thereof into the memory or other storage device of a data processing system.

In step 206, the document or file is edited by modifying or creating one of its sections. In step 208, the process checks to determine if the edited section is a new section. If the edited section is a preexisting section, the process branches to step 212 where the metadata for that section is updated by setting a temporary status flag to "modified." Returning to step 208, if the process determines that an edited section is a new section, then section metadata is created and associated with that new section in step 210. Then, in step 212, as explained above, the temporary status flag in the section metadata is updated by setting it to "modified." In step 214, if there are additional edits, the process branches back to step 206 where another section is edited. Thus, steps 206, 208, 210, 212 and 214 are repeated until all edited sections have had the temporary status flag in their respective section metadata updated to indicate that the section has been modified. If, in step 214, the process determines that there are no additional edits, it branches to step 216.

In step 216, the file being edited is saved to a storage device. In step 218, a list of modified sections is generated, and then the temporary status flag in each section metadata is cleared. In step 220, a document or file revision history with a list of modified sections is generated or updated. The document revision history is maintained and updated each time the file is edited, such that this revision history can be later recalled to display information about prior edits of each individual section. The process ends in step 222.

Figure 3:
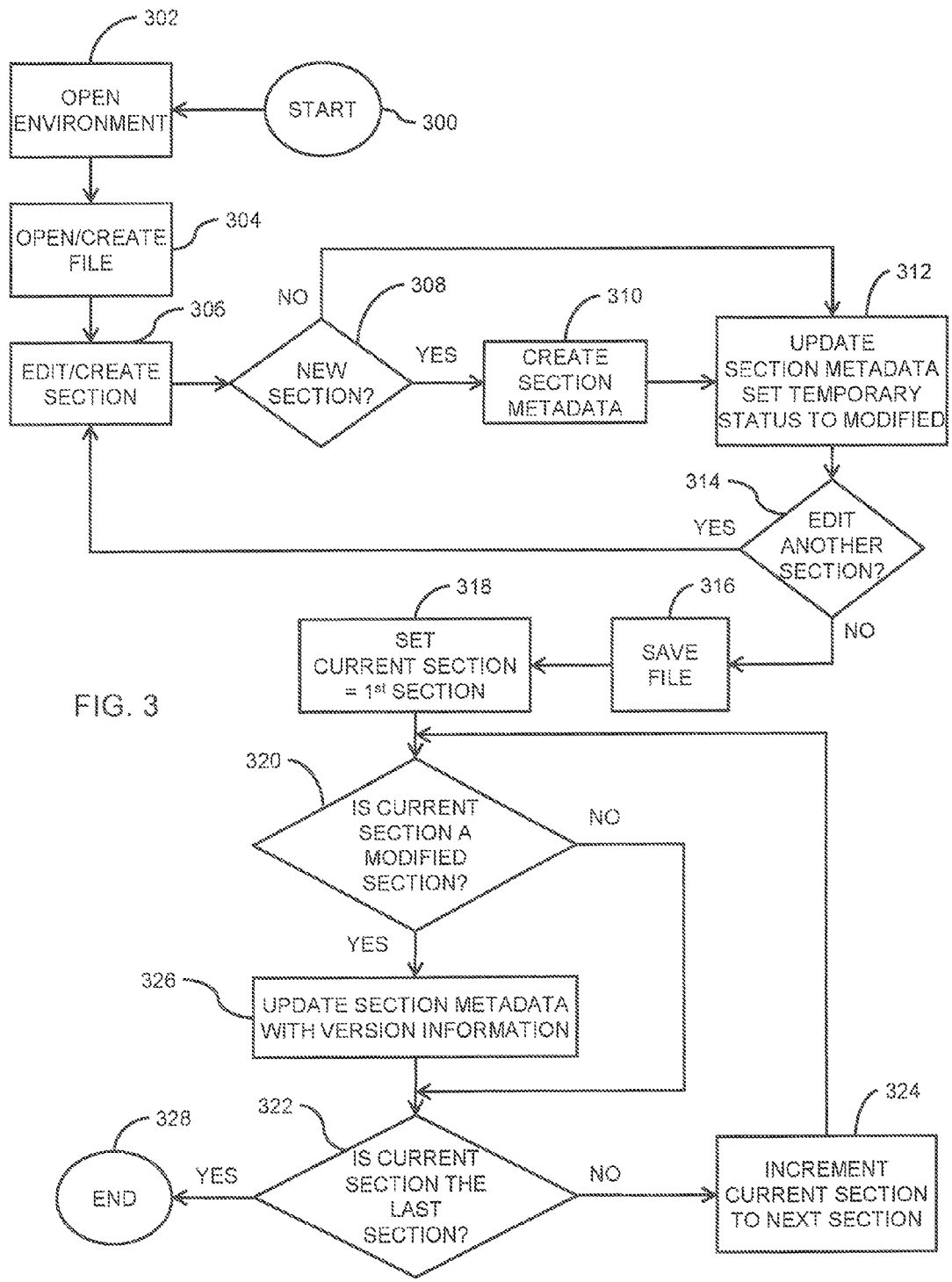
FIG. 3 is a flowchart of a process of another embodiment of the present invention in which section metadata is updated to include version and other information pertaining to revision history.

FIG. 3 is a flowchart of a process of another embodiment of the present invention in which section metadata is updated to include version and other information pertaining to revision history. Referring to this figure, the process starts in step 300. In step 302, a user opens an environment, such as an independent development environment (IDE) or other application in which associated documents or files can be modified. In step 304, a particular document or file within that environment is either opened (if it already exists) or created (if it doesn't currently exist). The process of opening a document or file involves, among other things, loading the document of file or a portion thereof into the memory or other storage device of a data processing system.

In step 306, the document or file is edited by modifying or creating one of its sections. In step 308, the process checks to determine if the edited section is a new section. If the edited section is a preexisting section, the process branches to step 312 where the metadata for that section is updated by setting a temporary status flag to "modified." In step 312, other information may be added to the section metadata, such as the modification author, and the date and time of the modification. Returning to step 308, if the process determines that an edited section is a new section, then section metadata is created and associated with that new section in step 310. Then, in step 312, as explained above, the temporary status flag in the section metadata is updated by setting it to modified, and other information may be added to the section metadata such as the author of the new section, and the date and time of the creation of the new section. In step 314, if there are additional edits, the process branches back to step 306 where another section is edited. Thus, steps 306, 308, 310, 312 and 314 are repeated until all edited sections have had their respective section metadata updated. If, in step 314, the process determines that there are no additional edits, it branches to step 316.

In step 316, the edited document or file is saved to a storage device. In step 318, a "current section" pointer is set to point to the first section of the document or file. In step 320, the process looks at the temporary status flag in the section metadata to determine if the current section has been recently modified. If the current section has not been recently modified, then the process branches to step 322 to determine if the current section is the last section of the document or file. If it is not the last section, the process branches to step 324, where the current section pointer is incremented to point to the next section and then return to step 320. In step 320, if the process determines that the current section is a modified section, then the section metadata is updated in step 326 by adding a version or revision number to the section metadata, and then clearing the temporary status flag for that section. The process remembers the previous version number and assigns the next version number in sequence to the current revision.

In the embodiment of the invention as illustrated in FIG. 3, each time a section of a document or file is edited, the modification author, the date and time of the modification, and the version number are stored in the section metadata, so that the complete revision history of an individual section can be recalled from the section metadata and displayed, as will be explained in more detail with respect to FIGS. 5 and 6.

Figure 4:
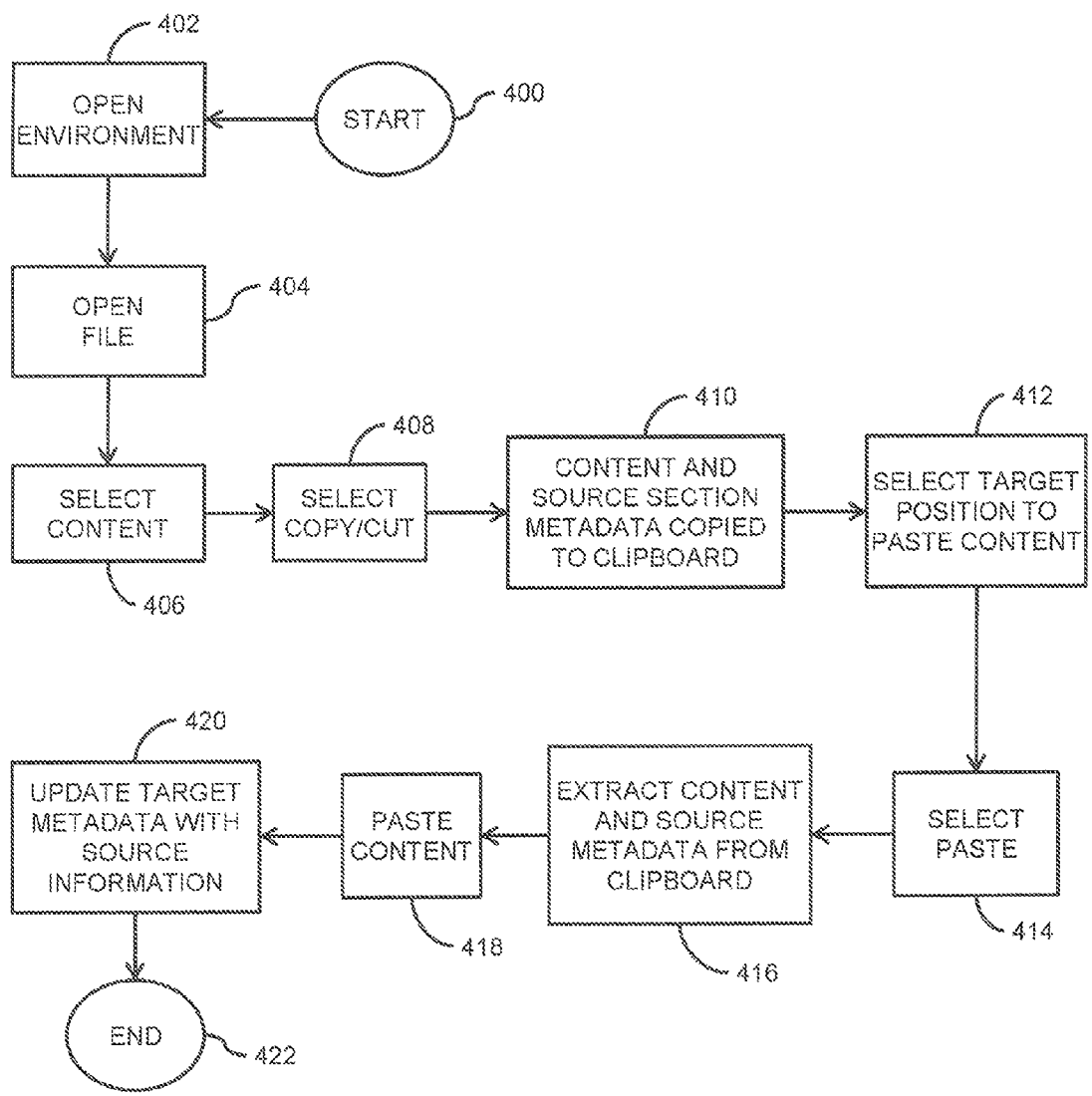
FIG. 4 is a flowchart of a process of the present invention in which section metadata is updated to include information regarding a copy/cut and paste operation from a source section to a target section.

FIG. 4 is a flowchart of a process of another embodiment of the present invention in which section metadata is updated to include information regarding a copy/cut and paste operation from a source section to a target section. Referring to this figure, the process starts at step 400. In step 402, a user opens an environment, such as an independent development environment (IDE) or other application in which associated documents or files can be modified. In step 404, a particular document or file within that environment is opened. In step 406, certain content of that document or file is selected from a source section, such as by highlighting through the use of a computer mouse or other pointing device, or through the use of a keyboard (see, for example, the highlighted "Section:B" of document/file 602 of FIG. 6). In step 408, an action is selected to either cut or copy the selected content, such as by the use of a right-click of a computer mouse to bring up a menu of options, followed by a left click on the selected menu option (see, for example, the right-click menu 604 in FIG. 6, which includes "copy" and "cut" options). In step 410, the selected content is copied to a clipboard (or other temporary storage area) in a custom format, in which both the selected content, as well as the section metadata associated with the source section of the selected content, are copied to the clipboard.

In step 412, a target position within the document or file is selected, such as through the use of a computer mouse or keyboard. In step 414, a paste operation is selected, such as through the use of a right-click of a computer mouse to bring up a menu of options, followed by a left click on the "paste" operation from the menu. In step 416, and in response to the selection of the paste operation, the selected content and associated metadata of the source section is extracted from the clipboard. In step 418, the selected content is pasted into the document or file at the target position. In step 420, the section metadata associated with the target section (the section associated with the target position) is updated to include information pertaining to the source section of the copy or cut operation. The process ends in step 422.

In the embodiment of the invention as illustrated FIG. 4, when a document or file is edited by selecting content from a source section, and pasting that selected content into a target section, certain metadata associated with the source section is added to the metadata associated with the target section. Thus, when the revision history of the target section is recalled, it may reveal information about the copy/cut and paste operation, including the source section from which the selected content was copied or cut.

Figure 5:
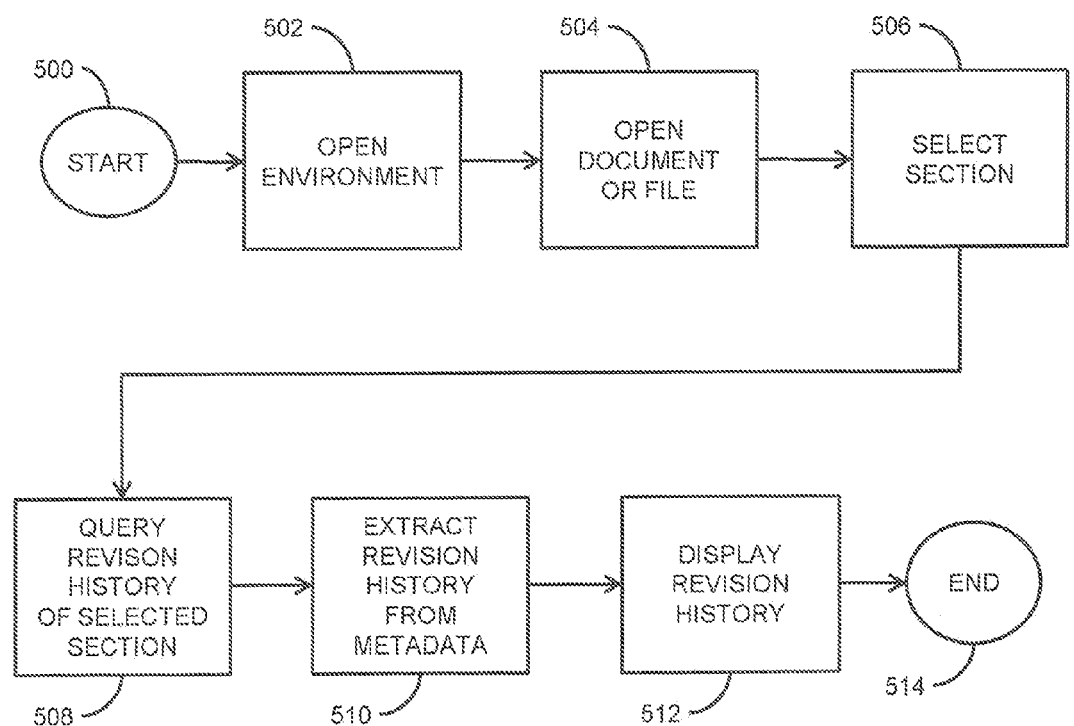
FIG. 5 is a flowchart of a process of the present invention in which revision history of a selected section of a file is displayed.
Figure 6:
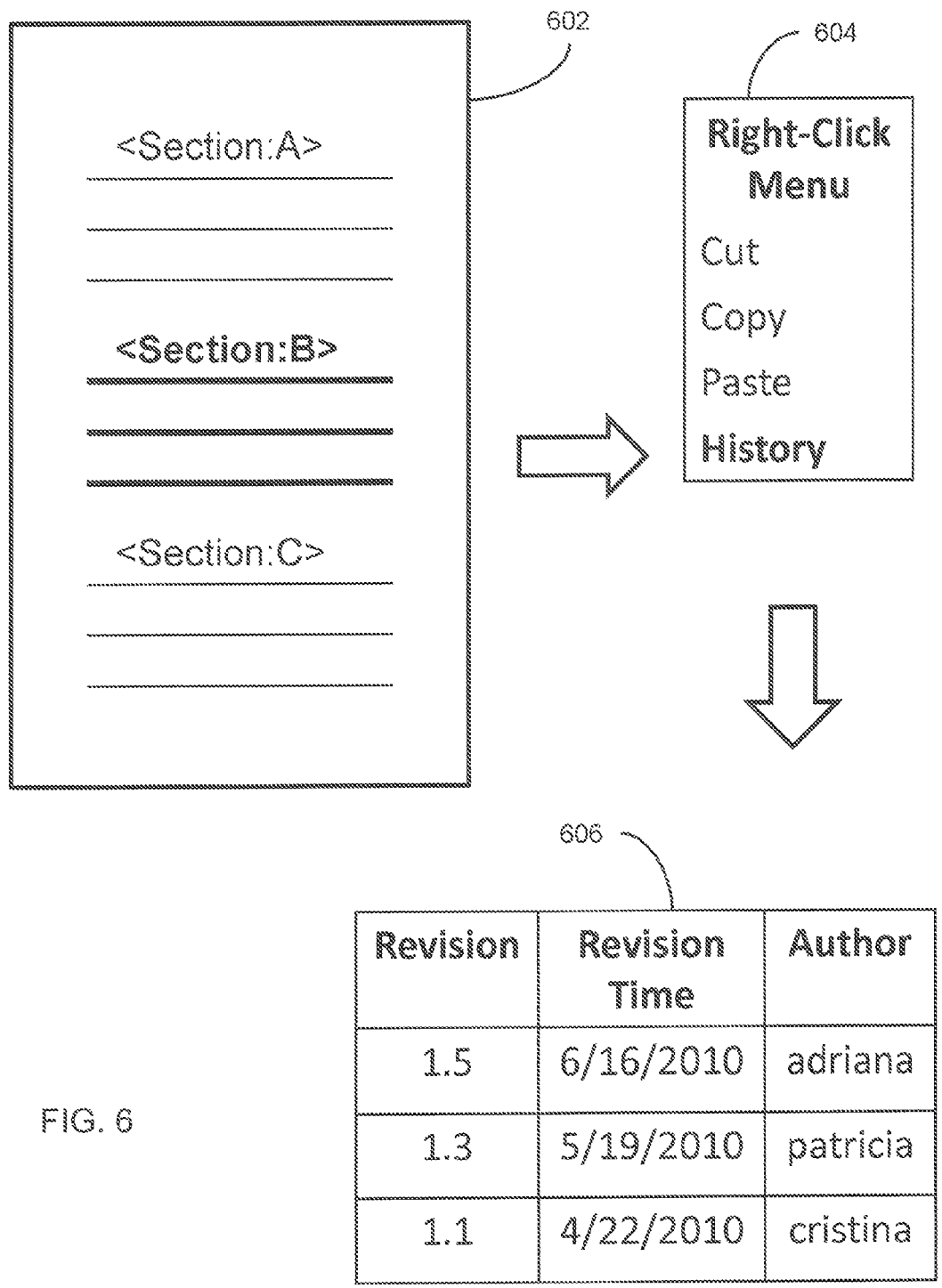
FIG. 6 is diagram of exemplary onscreen images that illustrate the selection of a specific section of a document or file, the query of the revision history of that selected section, and the display of the associated revision history.

FIG. 5 is a flowchart of a process of the present invention in which the revision history of a selected section of a document or file is displayed. FIG. 6 is diagram of exemplary images that may appear onscreen as a result of the implementation of the process of FIG. 5. Therefore, reference to FIG. 6 may be useful in visualizing the process of FIG. 5. Referring to FIGS. 5 and 6, the process starts at step 500. In step 502, a user opens an environment, such as an independent development environment (IDE) or other application in which associated documents or files can be modified. In step 504, a document or file is opened within that environment, such as document 602. In step 506, a particular section within that document or file is selected, such as by highlighting through the use of a computer mouse or other pointing device, or a keyboard (see highlighted "Section B" in FIG. 6).

In step 508, an action is selected to query the revision history of the selected section. The preferred method to initiate a query of the revision history is by a right-click of a computer mouse or other pointing device, the display of a menu in response to that right-click wherein the menu includes a revision history option (see bolded "History" option in menu 604 of FIG. 6), and the selection of that revision history option by the movement of an onscreen cursor over the revision history option, followed by a left-click of the mouse on the menu's revision history option. Other methods may be used to select a revision history option, such as by the selection of a predetermined combination of keys on a keyboard.

In step 510, the revision history information is extracted from the metadata of the selected section. In step 512, the revision history 606 for the selected section is displayed. The revision history 606 may be displayed by listing, for each modification that was made to the selected section, a version number, a revision date and time, and the revision author. Detailed information about each revision including insertions and deletions may also be displayed. If an embodiment of the invention is implemented in which copy/cut and paste operations are tracked, then the revision history may also display information pertaining to the source section of a copy/cut and paste operation.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
loading, into a memory of a data processing system, a file comprising data divided into a plurality of sections, each of the sections comprising section metadata, each of the section metadata comprising a section revision history;
querying a first section revision history in response to a selection of a first section from the plurality of sections, the first section comprising first section metadata, the first section metadata comprising the first section revision history, the first section revision history comprising information associated with a first change, a second change and a third change to the first section, wherein the first section is selected by highlighting the first section from a display of the plurality of sections, wherein the first section revision history is presented as a "History" option in a first pop-up window that appears in response to said highlighting of the first section, and wherein the first section revision history is presented in a second pop-up window that appears in response to clicking the "History" option in the first pop-up window; and
extracting the first section revision history from the first section metadata.

2. The method of claim 1, further comprising:
receiving a fourth change to the first section; and
updating the first section revision history to comprise information associated with the fourth change;
whereby the first section metadata comprises revision history information pertaining to cumulative changes that have occurred in the first section.

3. The method of claim 2, where the first section revision history comprises a version number, a revision date and a revision author for each of the first, second and third changes to the first section.

4. The method of claim 1, further comprising:
receiving a fourth change to the first section, the fourth change comprising a copy operation of a portion of a source section of the file, and a paste operation of the portion of the source section into a target section of the file, wherein the source section and the target section are different sections of the file; and
updating the first section revision history to comprise information that identifies a particular section in the file from which the portion of the source section was copied.

5. The method of claim 4, where the first section revision history comprises a version number, a revision date and a revision author for each of the first, second, third and fourth changes to the first section.

6. The method of claim 1, wherein the first section metadata identifies the first section as either being a modification to a particular section in the file or as being a new section in the file.

7. A computer program product comprising non-transitory a computer readable storage medium having computer readable program code embodied therewith, the computer readable program code comprising:
computer readable program code configured to open a file comprising data divided into a plurality of sections, each of the sections comprising section metadata, each of the section metadata comprising a section revision history;
computer readable program code configured to select a first section from the plurality of sections, the first section comprising first section metadata, the first section metadata comprising a first section revision history, the first section revision history comprising information associated with a first change, a second change and a third change to the first section, wherein the first section is selected by highlighting the first section from a display of the plurality of sections, wherein the first section revision history is presented as a "History" option in a first pop-up window that appears in response to said highlighting of the first section, and wherein the first section revision history is presented in a second pop-up window that appears in response to clicking the "History" option in the first pop-up window;
computer readable program code configured to query the first section revision history; and
computer readable program code configured to extract the first section revision history from the first section metadata.

8. The computer program product of claim 7, further comprising
computer readable program code configured to edit the file to comprise a fourth change to the first section; and
computer readable program code configured to update the first section revision history to comprise information associated with the fourth change.

9. The computer program product of claim 8, where the first section revision history comprises a version number, a revision date and a revision author for each of the first, second and third changes to the first section.

10. The computer program product of claim 7, further comprising:
computer readable program code configured to edit the file to comprise a fourth change to the first section, the fourth change comprising a copy operation of a portion of a source section of the file, and a paste operation of the portion of the source section into the first section; and
computer readable program code configured to update the first section revision history to comprise information pertaining to the source section of the paste operation.

11. The computer program product of claim 10, where the first section revision history comprises a version number, a revision date and a revision author for each of the first, second, third and fourth changes to the first section.

12. The computer program product of claim 7, where the first section revision history comprises a version number, a revision date and a revision author for each of the first, second and third changes to the first section.

13. An apparatus, comprising:
a storage device comprising computer executable program code;
a processor coupled to the storage device, where the processor executes the computer executable program code to direct the apparatus to:
open a file comprising data divided into a plurality of sections, each of the sections comprising section metadata, each of the section metadata comprising a section revision history;
select a first section from the plurality of sections, the first section comprising first section metadata, the first section metadata comprising a first section revision history, the first section revision history comprising information associated with a first change, a second change and a third change to the first section, wherein the first section is selected by highlighting the first section from a display of the plurality of sections, wherein the first section revision history is presented as a "History" option in a first pop-up window that appears in response to said highlighting of the first section, and wherein the first section revision history is presented in a second pop-up window that appears in response to clicking the "History" option in the first pop-up window;

query the first section revision history; and extract the first section revision history from the first section metadata.

14. The apparatus of claim 13, where the processor further executes the computer executable program code to direct the apparatus to:

edit the file to comprise a fourth change to the first section; and update the first section revision history to comprise information associated with the fourth change.

15. The apparatus of claim 14, where the first section revision history comprises a version number, a revision date and a revision author for each of the first, second and third changes to the first section.

16. The apparatus of claim 13, where the processor further executes the computer executable program code to direct the apparatus to:

edit the file to comprise a fourth change to the first section, the fourth change comprising a copy operation of a portion of a source section of the file, and a paste operation of the portion of the source section into a target section of the file; and update the first section revision history to comprise information that identifies the source section from which the portion of the source section was copied.

17. The apparatus of claim 15, where the first section revision history comprises a version number, a revision date and a revision author for each of the first, second, third and fourth changes to the first section.

18. The apparatus of claim 13, where the first section revision history comprises a version number, a revision date and a revision author for each of the first, second and third changes to the first section.

19. The method of claim 1, where the first section revision history comprises detailed information about insertions of content that have been made to the first section.

20. The method of claim 1, where the first section revision history comprises detailed information about deletions of content that have been made to the first section.

* * * * *